US005585447A

United States Patent [19]

Adisson et al.

[11] Patent Number: 5,585,447
[45] Date of Patent: Dec. 17, 1996

[54] CATALYST FOR THE (CO)POLYMERIZATION OF ALPHA-OLEFINS, A PROCESS FOR ITS PREPARATION AND (CO)POLYMERIZATION PROCESS MAKING USE THEREOF

[75] Inventors: Emmanuel Adisson, Divion; Karel Bujadoux, Lens; Michel Fontanille, Talence; Alain Deffieux, Bordeaux-Cauderan, all of France

[73] Assignee: ECP-Enichem Polymeres France S.A., Courbevoie, France

[21] Appl. No.: 514,717

[22] Filed: Aug. 14, 1995

Related U.S. Application Data

[63] Continuation of Ser. No. 107,711, Aug. 19, 1993, abandoned.

[30] Foreign Application Priority Data

Dec. 19, 1991 [FR] France .................................. 91 15818

[51] Int. Cl.$^6$ .......................................................... C08F 4/68
[52] U.S. Cl. ........................ 526/144; 502/104; 502/105; 502/107; 502/112; 502/128; 502/169
[58] Field of Search ............................ 526/144; 502/104, 502/105, 107, 112, 128, 169

[56] References Cited

U.S. PATENT DOCUMENTS 4,173,698  11/1979  Kanoh et al. ............................ 526/142

*Primary Examiner*—Romulo H. Delmendo
*Attorney, Agent, or Firm*—Burns, Doane, Swecker & Mathis, L.L.P.

[57] ABSTRACT

This catalyst has the general formula $VX_3$, $mAlX_3$, $nZ$, wherein X is a halogen atom, Z is at least one at least partially halogenated, branched or unbranched, saturated hydrocarbon, m is between 0.1 and 10, and n is between 1 and 300. To prepare it, a vanadium halide $VX_2$ and/or $VX_3$ is coground with an aluminum halide $AlX_3$, and then at least one halogenated hydrocarbon Z is added to the mixture obtained in proportions corresponding to the chosen values of m and n. The invention also relates to the (co)polymerization of alpha-olefins at 20°–350° C. in the presence of a catalyst system comprising at least one catalyst as defined above and at least one organometallic activator.

32 Claims, No Drawings

CATALYST FOR THE (CO)POLYMERIZATION OF ALPHA-OLEFINS, A PROCESS FOR ITS PREPARATION AND (CO)POLYMERIZATION PROCESS MAKING USE THEREOF

This application is a continuation, of application Ser. No. 08/107,711, filed Aug. 19, 1993 now abandoned.

The present invention relates to a catalyst for the homopolymerisation of alpha-olefins, especially of ethylene, and the copolymerisation of alpha-olefins with each other, especially of ethylene with at least one alpha-olefin containing from 3 to 12 carbon atoms, to a catalyst system comprising the said catalyst, to a process for the preparation of the catalyst and to a (co)polymerisation process making use of the said catalyst.

For many years it has been known to employ catalysts of Ziegler-Natta type, comprising at least one transition metal compound in combination with an activator, generally an organoaluminium compound, for (co)polymerising alpha-olefins under various conditions of temperature and pressure. The most commonly employed transition metal compounds are titanium compounds.

It is known, furthermore, that when vanadium compounds are employed as the only transition metal compounds in the (co)polymerisation of ethylene, their activity decreases very rapidly and, as a corollary, they produce (co)polymer yields which are not very high.

From document FR-A-2,090,646 it is also known to activate catalyst systems comprising a vanadium compound and an organoaluminium compound by means of carbon tetrachloride. According to this document the vanadium compound is obtained by treating with an alcohol a product of reaction of a vanadium compound with phosphoric acid or one of its derivatives. It is also known that catalysts of Ziegler-Natta type can have an improved activity if they are dispersed on an inorganic support such as magnesium chloride or oxide or silica. Many documents report attempts made in this direction. Catalyst systems containing vanadium are now highly complex, since they can include electron-donors to make them soluble, activators, supports and the like.

In order to be able to employ vanadium compounds without any other transition metal compound, the Applicant Company has been engaged in research aimed simultaneously at simplifying the previously known catalysts, increasing their activity in (co)polymerisation, finding catalysts which can be employed especially in a (co)polymerisation process at high pressure (>400 bars) and at high temperature (>150° C.); under these particular (co)polymerisation conditions the activity of the catalysts must be high and 10 therefore the latter must produce high yields of (co)polymers because it is not technically practicable to rid the (co)polymers obtained of the catalyst residues which they contain. The Applicant Company has now found a simple catalyst which meets these requirements and which is easy to prepare.

A first subject of the present invention consists of a catalyst for the homopolymerisation and the copolymerisation of alpha-olefins, comprising a vanadium compound activated by means of an organohalogen compound, characterised in that it has the general formula:

$VX_3, mAlX_3, nZ$ in which:

X is a halogen atom;

Z is at least one at least partially halogenated, branched or unbranched, saturated hydrocarbon, m is between 0.1 and 10, and n is between 1 and 300.

The halogen atom X is preferably chlorine or bromine, advantageously chlorine. The value of m is advantageously between 0.2 and 3, preferably close to or equal to 0.33.

The halogenated hydrocarbon Z belongs to the aliphatic or cycloaliphatic series and contains at least one carbon atom in its molecule and at least one halogen atom advantageously chosen from fluorine, chlorine and bromine, preferably chlorine. It may contain different halogen atoms. The number of carbons in Z is not critical but is preferably smaller than 10.

Examples of such halogenated hydrocarbons are chloromethane, dichloromethane, bromochloromethane, dibromomethane, trichloromethane (chloroform), tribromomethane (bromoform), carbon tetrachloride, bromotrichloromethane, fluorotrichloromethane, tetrabromomethane, 1,2-dichloroethane, 1,1,1-trichloroethane, 1,1,1-trichloro-2,2,2-trifluoroethane and hexachloroethane.

n is preferably between 2 and 100, advantageously between 4 and 50.

The determination of the composition of the catalyst according to the invention can be carried out analytically by means:

of a distillation to determine the content of halogenated hydrocarbon Z, of an acid digestion by means of a $H_2SO_4/KHSO_4$ mixture which makes it possible to obtain a solution on which the vanadium and aluminium content is determined by flame atomic absorption spectrometry and the halogen content by potentiometry using silver nitrate.

The catalyst may be additionally used in combination with at least one branched or unbranched, aliphatic or cycloaliphatic, saturated hydrocarbon which is preferably liquid in normal temperature and pressure conditions and contains at least 6 carbon atoms. This is, for example, cyclohexane, methylcyclohexane, isododecane or $C_{10}$–$C_{12}$ saturated hydrocarbon cuts. In the presence or absence of the said saturated hydrocarbon the catalyst according to the invention generally takes the form of a suspension.

The catalyst according to the invention advantageously consists of the compounds described above ($VX_3$, $AlX_3$, Z, saturated hydrocarbon if appropriate) to the exclusion of any other compound such as electron-donor, inorganic support, complexing agent and the like. To be active in (co)polymerisation, however, it must be converted into a catalyst system by means of an activator.

Another subject of the present invention consists of a catalyst system for the homopolymerisation and copolymerisation of alpha-olefins, comprising at least one transition metal compound and at least one organometallic activator, characterised in that the transition metal compound is a catalyst as described above.

Thus, before being employed in (co)polymerisation, preferably just before, or even in situ, the catalyst according to the invention is converted into a catalyst system by the action of at least one organometallic activator (compound of a metal of groups I to III of the Periodic Classification), generally at ambient temperature with stirring.

The nature and the quantity of the activator are chosen as a function of the desired performance (more or less reducing activator, catalyst system which has a high initial activity or else which produces a polymer of specific melt index, and the like). The quantity of activator is nevertheless generally between 1 and 100 times the molar quantity of vanadium halide.

The activator is advantageously chosen from trialkylaluminiums $AlR_3$, halodialkylaluminiums such as $Al(C_2H_5)_2Cl$, dihaloalkylaluminiums such as $AlC_2H_5Cl_2$, alkylaluminium sesquihalides, tetraalkylaluminoxanes RR'Al—O—AlR"R'", monoalkylsilanolatodialkylaluminiums $RH_2Si$—O—AlR'R", dialkylsilanolatodialkylaluminiums RHR'Si—O—AlR"R'", pentaalkylsiloxalanes RR'R"Si—O—AlR'"R"" such as dimethylethyldiethylsiloxalane, alkoxydialkylaluminiums R—O—AlR'R" such as ethoxydiethylaluminium, dialkoxyalkylaluminiums RO(R'O)AlR" and mixtures thereof, the alkyl radicals R, R', R", R'" and R"" which are identical or different, containing from 1 to 12 carbon atoms.

A trialkylaluminium of formula $R_3Al$ is preferably chosen, in which R is a substituted or unsubstituted alkyl radical containing from 1 to 10 carbon atoms, advantageously chosen from ethyl, isobutyl, n-hexyl and n-octyl radicals.

The organometallic activator is employed in a quantity such that the ratio of the metal which it contains (generally aluminium) to the vanadium of the catalyst is between 1 and 100, preferably between 2 and 50, advantageously between 4 and 20.

Used in combination with a suitable activator, the catalyst according to the invention makes it possible to obtain an ethylene homopolymer which has a low polydispersity value (ratio of the mass-average molecular mass to the number-average molecular mass, as determined by gel permeation chromatography), in a high yield. During the copolymerisation of ethylene with at least one alpha-olefin it makes it possible to obtain, also in high yields, copolymers which have a higher comonomer content, at the same alpha-olefin/ethylene ratio entering copolymerisation, and a more homogeneous distribution of the comonomer units, and a generally narrow and unimodal distribution of the molecular masses.

Another subject of the present invention consists of a process for the preparation of a catalyst as defined above, comprising a first stage of cogrinding of a vanadium halide chosen from the compounds of formulae $VX_2$ and $VX_3$ and mixtures thereof, in which formulae X is a halogen atom, advantageously chlorine or bromine, with an aluminium halide $AlX_3$, and a second stage consisting in adding at least one halogenated hydrocarbon Z as defined above to the mixture obtained during the first stage, the molar ratio of the aluminium halide to the vanadium compound being between 0.1 and 10, the molar ratio of the halogenated hydrocarbon(s) Z to the vanadium compound being between 1 and 300.

The cogrinding of the vanadium halide and the aluminium halide is advantageously carried out for a sufficient time, using a mill capable of supplying a grinding energy such that the mixture of vanadium halide and of aluminium halide is in the form of a solid solution that can be identified by means of its X-ray spectrum.

The halogenated hydrocarbon(s) may be added at the time of the cogrinding or else afterwards. In the case where $VCl_2$ is employed it is preferable to apply the cogrinding in the presence of the halogenated hydrocarbon(s).

It is noted that the catalyst according to the invention can be obtained by employing a vanadium dihalide $VX_2$, especially $VCl_2$, as initial vanadium compound. It has been found, in fact, that, in the presence of the halogenated hydrocarbon(s) Z, and after a sufficient contact time, generally from a few hours to a few days, as an inverse function of the temperature, the compound $VX_2$ is oxidised to $VX_3$ (whereas the compound $VX_3$ is not converted into $VX_4$).

When $VX_3$ is employed as initial vanadium compound the respective quantities of VX3, $AlX_3$ and Z correspond to those indicated in the description of the catalyst.

When $VX_2$ is employed as initial vanadium compound the quantity of halogenated hydrocarbon(s) Z to be employed during the preparation must be such that the atomic ratio of the halogen atoms which it contains to the vanadium is at least 3, advantageously higher than or equal to 10. A halogenated hydrocarbon Z containing at least 3 halogen atoms in its molecule is preferably employed.

The process for the preparation of the catalyst according to the invention is performed at a temperature which may be between approximately 0° and 80° C., advantageously close to the ambient temperature.

The process for the preparation of the catalyst may additionally be performed in the presence of a branched or unbranched aliphatic or cycloaliphatic saturated hydrocarbon, as defined above, the addition of the said saturated hydrocarbon taking place during the cogrinding, after the cogrinding or after addition of the halogenated hydrocarbon(s), or in the course of each of these stages.

Another subject of the present invention consists of a process for (co)polymerisation of alpha-olefins at a temperature of approximately between 20° and 350° C., in the presence of at least one catalyst as described above and of at least one activator, and therefore in the presence of a catalyst system as described above. The olefines which can be polymerised by this process include especially ethylene and α-olefins containing from 3 to 6 carbon atoms, such as propylene, 1-butene and 4-methyl-1-pentene. Ethylene can also be copolymerised with α-olefins containing from 3 to 12 carbon atoms, such as, in addition to those just mentioned, 1-hexene and 1-octene.

The polymerisation or copolymerisation can be performed by a continuous or noncontinuous process, in an autoclave or tubular reactor.

The polymerisation process can be performed at a temperature of between 20° and 250° C., at a pressure ranging up to approximately 200 bars, in solution or in suspension in an inert hydrocarbon which contains at least 6 carbon atoms, such as a $C_{10}$–$C_{12}$ saturated aliphatic hydrocarbon cut.

In the case of the (co)polymerisation of ethylene it may also be performed, continuously, in a reactor in which the average residence time of the catalyst is approximately between 1 and 150 seconds, the polymerisation being performed at a temperature of approximately between 160° and 350° C., at a pressure of approximately between 400 and 3000 bars.

In order to control the molecular mass of the (co)polymer obtained and its melt index, the operation can be carried out in the presence of up to 2 mol % of a chain transfer agent such as hydrogen. The polymerisation process according to the invention makes it possible to obtain a whole range of ethylene (co)polymers of relative density between 0.86 and 0.97, depending on the ratio of ethylene to the comonomer(s) forming the gas stream subjected to polymerisation.

The examples below are intended to illustrate the invention without any limitation being implied.

EXAMPLES 1 TO 9

Preparation of the Catalyst

Vanadium trichloride $VCl_3$, on the one hand, and aluminium trichloride $AlCl_3$, on the other hand, in an Al/V molar ratio=⅓, were introduced into a noncontinuous ball mill. After seven hours' cogrinding, the $VCl_3 \cdot \frac{1}{3}AlCl_3$ solid solution obtained was suspended in a halogenated hydrocarbon Z the nature of which appears in Table I, in a Z/V molar ratio which is also shown in Table I.

TABLE I

| Example | Z | Z/V |
|---|---|---|
| 1 | $CCl_4$ | 4 |
| 2 | $CCl_4$ | 10 |
| 3 | $CCl_4$ | 20 |
| 4 | $CCl_4$ | 30 |
| 5 | $CCl_4$ | 50 |
| 6 | $CCl_4$ | 100 |
| 7 | $CCl_4$ | 250 |
| 8 | $CH_3$—$CCl_3$ | 10 |
| 9 | $CH_3$—$CCl_3$ | 30 |
| 10 | $CH_3$—$CCl_3$ | 100 |
| 11 | $CHCl_3$ | 30 |
| 12 | $CHBr_3$ | 30 |
| 13* | $CCl_3$—$CCl_3$ | 30 |
| 14 | $CH_2Cl_2$ | 30 |
| 15 | $CH_2BrCl$ | 30 |
| 16 | $CH_2Br_2$ | 30 |
| 17 | $CF_3CCl_3$ | 30 |
| 18 | $CBrCl_3$ | 30 |
| 19* | $CBr_4$ | 30 |

*In the case of Ex. 13 and 19, the solid solution obtained was first of all suspended in a sufficient quantity of isododecane to obtain a suspension that could be handled.

EXAMPLES 20 TO 46

Homopolymerisation of Ethylene 500 ml of isododecane were introduced into an autoclave reactor of 1-liter capacity, fitted with means for stirring and temperature control, and were purged with nitrogen while the temperature was raised to 160° C. Ethylene was then introduced up to a gauge pressure of 4 bars and then the catalyst system prepared in the injection gas lock of the autoclave by introducing the organoaluminium activator and the catalyst suspension into it successively. The pressure of 4 bars was maintained for 1 minute by adding ethylene and the temperature of 160° C. was also kept constant.

The content of the reactor was then discharged and the polymer was separated, washed, dried and weighed. The quantity Q obtained is expressed in Table II below in kg of polyethylene per gram of vanadium per minute.

Table II also shows the catalyst employed, referred to by the number of its example of preparation, the quantity of catalyst employed, expressed in millimoles of vanadium, the nature of the organoaluminium activator A and the quantity employed, expressed as the molar ratio Al/V.

The catalyst according to the invention is practically nondimerising, the methyl group content of the ethylene homopolymer obtained being at most 3 per 1000 carbon atoms, whichever the example.

TABLE II

| | Catalyst | | A | | Polyethylene |
|---|---|---|---|---|---|
| Example | according to Example | Quantity mmol V | Nature* | Al/V | Q |
| 20 | 1 | 0.01 | THA | 10 | 10.6 |
| 21 | 2 | 0.01 | THA | 10 | 12 |
| 22 | 3 | 0.01 | THA | 10 | 14.2 |
| 23 | 4 | 0.01 | THA | 10 | 15.1 |
| 24 | 5 | 0.01 | THA | 10 | 13.6 |
| 25 | 6 | 0.01 | THA | 10 | 11.8 |
| 26 | 7 | 0.01 | THA | 10 | 7.1 |
| 27 | 4 | 0.008 | TEA | 10 | 15.3 |
| 28 | 4 | 0.005 | TEA | 10 | 14.8 |
| 29 | 8 | 0.005 | TEA | 10 | 11.8 |
| 30 | 8 | 0.004 | THA | 10 | 13.7 |
| 31 | 9 | 0.005 | TEA | 10 | 17.5 |
| 32 | 10 | 0.005 | TEA | 10 | 18.3 |
| 33 | 10 | 0.005 | TEA | 30 | 17.9 |
| 34 | 10 | 0.005 | TEA | 100 | 18.5 |
| 35 | 10 | 0.004 | TRA | 10 | 18.3 |
| 36 | 10 | 0.004 | THA | 30 | 18.9 |
| 37 | 10 | 0.004 | THA | 100 | 18.9 |
| 38 | 11 | 0.005 | TEA | 10 | 11.7 |
| 39 | 12 | 0.005 | TEA | 10 | 11.7 |
| 40 | 13 | 0.005 | TEA | 10 | 12.1 |
| 41 | 14 | 0.01 | TEA | 10 | 4.6 |
| 42 | 15 | 0.01 | TEA | 10 | 5.2 |
| 43 | 16 | 0.01 | TEA | 10 | 5.6 |
| 44 | 17 | 0.005 | TEA | 10 | 6.2 |
| 45 | 18 | 0.005 | TEA | 10 | 7.2 |
| 46 | 19 | 0.005 | TEA | 10 | 5.8 |

*THA: tri-n-hexylaluminium
TEA: triethylaluminium

By way of comparison, trial homopolymerisations of ethylene were carried out under the same temperature, pressure and time conditions as in Examples 20 to 46, but employing catalysts which do not correspond to the above description of the catalysts according to the invention (absence of $AlCl_3$ or of halogenated hydrocarbon Z or of both). The data and results from these comparative examples are collated in Table III.

TABLE III

| Comparative Example | Catalyst Nature | Quantity (mmol V) | Halogenated hydrocarbon Z Nature | Molar Z/V | Activator Nature | Molar Al/V | Q Polyethylene kg/g of V/min |
|---|---|---|---|---|---|---|---|
| C I | $VCl_3$ | 0.1 | — | — | THA* | 10 | 0.85 |
| C II | $VCl_3$ | 0.1 | — | — | TEA** | 10 | 0.8 |
| C III | $VCl_3$ | 0.01 | $CCl_4$ | 30 | TEA | 10 | 4.6 |
| C IV | $VCl_3$ | 0.01 | $CH_2Cl_2$ | 30 | TEA | 10 | 2 |
| C V | $VCl_3$ | 0.01 | $CHCl_3$ | 30 | TEA | 10 | 2.5 |
| C VI | $VCl_3, \frac{1}{3}AlCl_3$ | 0.1 | — | — | TEA | 10 | 1.3 |
| C VII | $VCl_3, \frac{1}{3}AlCl_3$ | 0.05 | — | — | TEA | 10 | 1.4 |

TABLE III-continued

| Comparative Example | Catalyst | | Halogenated hydrocarbon Z | | Activator | | Q |
|---|---|---|---|---|---|---|---|
| | Nature | Quantity (mmol V) | Nature | Molar Z/V | Nature | Molar Al/V | Polyethylene kg/g of V/min |
| C VIII | $VCl_3, \frac{1}{3}AlCl_3$ | 0.1 | — | — | THA | 10 | 2 |
| C IX | $VCl_3, \frac{1}{3}AlCl_3$ | 0.01 | — | — | THA | 10 | 3.5 |
| C X | $VCl_3, \frac{1}{3}AlCl_3$ | 0.04 | — | — | TEA | 10 | 1.7 |
| C XI | $VCl_3, \frac{1}{3}AlCl_3$ | 0.04 | — | — | TEA | 20 | 1.5 |
| C XII | $VCl_3, \frac{1}{3}AlCl_3$ | 0.04 | — | — | TEA | 50 | 1.35 |
| C XIII | $VCl_{1919}Y_3, \frac{1}{3}AlCl_3$ | 0.04 | — | — | TEA | 75 | 1.2 |
| C XIV | $VCl_3, \frac{1}{3}AlCl_3$ | 0.02 | — | — | THA | 10 | 3.7 |
| C XV | $VCl_3, \frac{1}{3}AlCl_3$ | 0.02 | — | — | THA | 20 | 3.5 |
| C XVI | $VCl_3, \frac{1}{3}AlCl_3$ | 0.02 | — | — | THA | 50 | 3.1 |

*THA: tri-n-hexylaluminium
**TEA: triethylaluminium

EXAMPLES 47 TO 59

Copolymerisation of ethylene with 1-hexene 500 ml of isododecane were introduced into an autoclave reactor of 1-liter capacity, fitted with means for stirring and temperature control and were purged with nitrogen while the temperature was raised to 160° C. 1-Hexene was then introduced in a quantity q, expressed in ml in Table IV below, followed by ethylene up to a gauge pressure of 4 bars, and then the catalyst system prepared in the autoclave injection gas lock by introducing the organoaluminium activator and the catalyst suspension into it successively. The pressure of 4 bars was maintained for 1 minute by adding ethylene and the temperature of 160° C. was also kept constant.

The content of the reactor was then discharged and the copolymer obtained was separated, washed, dried and weighed. Table IV shows, in addition to the quantity of 1-hexene q, the catalyst employed, referred to by the number of its example of preparation, the quantity employed, expressed in millimoles of vanadium, the nature of the organoaluminium activator A and the quantity employed, expressed as the molar ratio Al/V, and the quantity Q of copolymer formed, expressed in grams per gram of vanadium per minute, together with the content SCB of n-butyl short branches of the copolymer, determined by measuring the methyl group content according to ASTM standard D 2238, and expressed in number of short branches per 1000 total methylene carbons.

TABLE IV

| Example | 1-Hexene q ml | Catalyst According to Example | Quantity mmol V | A Nature* | Al/V | Copolymer Q | SCB |
|---|---|---|---|---|---|---|---|
| 47 | 10 | 3 | 0.1 | THA | 10 | 1060 | 17.9 |
| 48 | 25 | 3 | 0.1 | THA | 10 | 870 | 27.5 |
| 49 | 35 | 3 | 0.1 | THA | 10 | 520 | 33.0 |
| 50 | 35 | 3 | 0.1 | TEA | 10 | 330 | 25.0 |
| 51 | 35 | 2 | 0.1 | THA | 10 | 270 | 32.5 |
| 52 | 35 | 5 | 0.1 | THA | 10 | 240 | 33.2 |
| 53 | 30 | 11 | 0.1 | TEA | 10 | 1385 | 25.0 |
| 54 | 30 | 11 | 0.05 | TEA | 10 | 1510 | 24.7 |
| 55 | 20 | 11 | 0.1 | TEA | 10 | 1380 | 20.4 |
| 56 | 20 | 11 | 0.05 | TEA | 10 | 1740 | 19.7 |
| 57 | 10 | 11 | 0.01 | TEA | 10 | 2010 | 11.3 |
| 58 | 50 | 11 | 0.05 | TEA | 10 | 720 | 35.5 |
| 59 | 30 | 9 | 0.025 | TEA | 10 | 1840 | 25.2 |

*THA: tri-n-hexylaluminium
**TEA: triethylaluminium

By way of comparison, trial copolymerisations of ethylene with 1-hexene were carried out under the same temperature, pressure and time conditions as in Examples 7 to 59, but using catalysts which did not respond to the above description of the catalysts according to the invention. The data and results from these comparative examples are collated in Table V.

TABLE V

| Comparative Example | 1-Hexene q ml | Catalyst Nature | Quantity mmol V | Halogenated hydrocarbon Nature | Molar Z/V | A Nature* | Molar Al/V | Copolymer Q g/g of V/min | SCB |
|---|---|---|---|---|---|---|---|---|---|
| C XVII | 10 | $VCl_3$ | 0.1 | — | — | THA | 10 | 430 | 10.8 |
| C XVIII | 30 | $VCl_3$ | 0.1 | — | — | TEA | 10 | 180 | 14.2 |
| C XIX | 50 | $VCl_3$ | 0.1 | — | — | THA | 10 | 130 | 18.2 |
| C XX | 30 | $VCl_3$ | 0.1 | $CHCl_3$ | 30 | TEA | 10 | 640 | 22.5 |
| C XXI | 30 | $VCl_3$ | 0.1 | $CCl_4$ | 50 | TEA | 10 | 180 | 19.8 |
| C XXII | 50 | $VCl_3$ | 0.1 | $CHCl_3$ | 30 | TEA | 10 | 550 | 30.0 |
| C XXIII | 10 | $VCl_3, \frac{1}{3}AlCl_3$ | 0.1 | — | — | THA | 10 | 830 | 12.3 |
| C XXIV | 10 | $VCl_3, \frac{1}{3}AlCl_3$ | 0.2 | — | — | TEA | 10 | 765 | 10.9 |
| C XXV | 30 | $VCl_3, \frac{1}{3}AlCl_3$ | 0.15 | — | — | TEA | 10 | 340 | 24.7 |
| C XXVI | 50 | $VCl_3, \frac{1}{3}AlCl_3$ | 0.2 | — | — | TEA | 10 | 145 | 35.0 |

TABLE V-continued

| | | Catalyst | | Halogenated hydrocarbon | | A | | Copolymer Q | |
|---|---|---|---|---|---|---|---|---|---|
| Comparative Example | 1-Hexene q ml | Nature | Quantity mmol V | Nature | Molar Z/V | Nature* | Molar Al/V | g/g of V/min | SCB |
| C XXVII | 30 | $VCl_3, \frac{1}{3}AlCl_3$ | 0.15 | — | — | THA | 10 | 500 | 29.8 |
| C XXVIII | 50 | $VCl_3, \frac{1}{3}AlCl_3$ | 0.2 | — | — | THA | 10 | 310 | 38.5 |

*THA: tri-n-hexylaluminium; TEA: triethylaluminium

We claim:

1. Catalyst for the homopolymerisation or copolymerisation of alpha-olefins, comprising a vanadium compound activated by means of an organohalogen compound, wherein said catalyst comprises compounds of the formulas:

$VX_3$, $AlX_3$, and Z wherein $VX_3$ and $AlX_3$ are in the form of a solid solution suspended in Z, and further wherein X is a halogen atom;

Z is at least one at least partially halogenated, branched or unbranched, saturated hydrocarbon, and said compounds are present in the molar ratio of $VX_3$:$mAlX_3$:$nZ$
wherein
m is between 0.1 and 10, and
n is between 1 and 300.

2. Catalyst according to claim 1, wherein X of $VX_3$ and $AlX_3$ is chlorine.

3. Catalyst according to claim 1 or 2, wherein m is between 0.2 and 3.

4. Catalyst according to claim 1 or 2, wherein n is between 2 and 100.

5. Catalyst according to claim 4, wherein n is between 4 and 50.

6. Catalyst according to claim 3, wherein n is between 2 and 100.

7. Catalyst according to claim 6, wherein n is between 4 and 50.

8. Catalyst system for the homopolymerisation or copolymerisation of alpha-olefins, comprising at least one transition metal compound and at least one organometallic activator, wherein the transition metal compound is a catalyst comprising a vanadium compound activated by means of an organohalogen compound, wherein said catalyst comprises compounds of the formulas:

$VX_3$, $AlX_3$, and Z wherein $VX_3$ and $AlX_3$ are in the form of a solid solution suspended in Z, and further wherein X is a halogen atom;

Z is at least one at least partially halogenated, branched or unbranched, saturated hydrocarbon, and said compounds are present in the molar ratio of $VX_3$:$mAlX_3$:$nZ$ wherein
m is between 0.1 and 10, and
n is between 1 and 300.

9. Catalyst according to claim 8, wherein X of $VX_3$ and $AlX_3$ is chlorine.

10. Catalyst system according to claim 8, wherein m is between 0.2 and 3.

11. Catalyst system according to claim 8, wherein n is between 2 and 100.

12. Catalyst system according to claim 11, wherein n is between 4 and 50.

13. Catalyst system according to claim 10, wherein n is between 2 and 100.

14. Catalyst system according to claim 13, wherein n is between 4 and 50.

15. Process for the preparation of a catalyst for the homopolymerisation or copolymerisation of alpha-olefins, comprising a vanadium compound activated by means of an organohalogen compound, wherein said catalyst comprises compounds of the formulas:

$VX_3$, $AlX_3$, and Z wherein $VX_3$ and $AlX_3$ are in the form of a solid solution suspended in Z, wherein said process comprises a first stage of cogrinding of a vanadium halide chosen from the compounds of formulae $VX_2$ and $VX_3$ and mixtures thereof, in which formulae X is a halogen atom, with an aluminum halide $AlX_3$, and a second stage comprising adding at least one halogenated hydrocarbon Z, to the mixture obtained during the first stage, the molar ratio of the aluminum halide to the vanadium compound being between 0.1 and 10, the molar ratio of the halogenated hydrocarbon(s) Z to the vanadium compound being between 1 and 300.

16. Process according to claim 15, wherein said process is performed at a temperature of between 0° and 80° C.

17. Process according to claim 15, wherein a branched or unbranched, aliphatic or cycloaliphatic, saturated hydrocarbon is added during at least one of the two stages and/or after the second stage.

18. Process according to claim 15, wherein X of $VX_3$ and $AlX_3$ is chlorine.

19. Process according to claim 15, wherein m is between 0.2 and 3.

20. Process according to claim 15, wherein n is between 2 and 100.

21. Process system according to claim 20, wherein n is between 4 and 50.

22. Process according to claim 19, wherein n is between 2 and 100.

23. Process according to claim 22, wherein n is between 4 and 50.

24. Process for (co)polymerisation of alpha-olefins at a temperature of between 20° and 350° C., in the presence of a catalyst system comprising at least one transition metal compound and at least one organometallic activator wherein the transition metal compound is a catalyst, comprising a vanadium compound activated by means of an organohalogen compound, wherein said catalyst comprises compounds of the formulas:

$VX_3$, $AlX_3$, and Z wherein $VX_3$ and $AlX_3$ are in the form of a solid solution suspended in Z, and further wherein X is a halogen atom:

Z is at least one at least partially halogenated, branched or unbranched, saturated hydrocarbon, and said compounds are present in the molar ratio of $VX_3:mAlX_3:nZ$ wherein m is between 0.1 and 10, and n is between 1 and 300.

25. Process according to claim 24, wherein the (co)polymerisation is performed at a temperature of between 20° and 250° C., at a pressure ranging up to 200 bars, in solution or in suspension in an inert liquid hydrocarbon containing at least 6 carbon atoms.

26. Process according to claim 24, wherein the alpha-olefin is ethylene, further wherein the process is performed continuously in a reactor in which the average residence time of the catalyst is between 1 and 150 seconds, and wherein the (co)polymerisation is performed at a temperature of between 160° and 350° C., and at a pressure of between 400 and 3000 bars.

27. Process according to claim 24, wherein X of $VX_3$ and $AlX_3$ is chlorine.

28. Process according to claim 24, wherein m is between 0.2 and 3.

29. Process according to claim 24, wherein n is between 2 and 100.

30. Process according to claim 29, wherein n is between 4 and 50.

31. Process according to claim 28, wherein n is between 2 and 100.

32. Process according to claim 31, wherein n is between 4 and 50.

* * * * *